United States Patent
Thorsen et al.

(10) Patent No.: US 8,459,338 B2
(45) Date of Patent: Jun. 11, 2013

(54) SCRAPED SURFACE HEAT EXCHANGER AND A METHOD FOR PRODUCING WHEY PROTEIN CONCENTRATE

(75) Inventors: Knud Thorsen, Gjern (DK); Preben Koeningsfeldt, Hoerning (DK); Ole Poulsen, Engesvang (DK)

(73) Assignee: INVENSYS APV A/S, Silkeborg (DK)

( * ) Notice: Subject to any disclaimer, the term of this patent is extended or adjusted under 35 U.S.C. 154(b) by 0 days.

(21) Appl. No.: 13/413,089

(22) Filed: Mar. 6, 2012

(65) Prior Publication Data

US 2012/0214977 A1    Aug. 23, 2012

Related U.S. Application Data

(62) Division of application No. 12/089,338, filed as application No. PCT/EP2006/009616 on Oct. 4, 2006, now Pat. No. 8,151,869.

(30) Foreign Application Priority Data

Oct. 5, 2005  (EP) .................................... 05021730

(51) Int. Cl.
  *F28F 17/00*   (2006.01)
  *A47J 39/00*   (2006.01)

(52) U.S. Cl.
  USPC .............................. 165/94; 165/91; 426/520

(58) Field of Classification Search
  USPC ...................................... 165/91, 94; 426/520
  See application file for complete search history.

(56) References Cited

U.S. PATENT DOCUMENTS

| | | | |
|---|---|---|---|
| 2,589,350 A | 3/1952 | Edmunds, Jr. | |
| 3,266,904 A | 8/1966 | Duin et al. | |
| 3,846,570 A | 11/1974 | Vetter et al. | |
| 3,848,289 A | 11/1974 | Bachmann | |
| 4,185,352 A | 1/1980 | Smith | |
| 5,252,352 A | 10/1993 | Banach et al. | |
| 5,485,880 A | 1/1996 | Zeuthen et al. | |
| 7,250,183 B2 * | 7/2007 | Lindstrom et al. | 426/36 |
| 7,302,999 B2 | 12/2007 | Hardy | |
| 8,057,839 B2 * | 11/2011 | Bovetto et al. | 426/656 |
| 2010/0028503 A1 * | 2/2010 | Loh et al. | 426/244 |

FOREIGN PATENT DOCUMENTS

| EP | 0250623 B1 | 10/1990 |
|---|---|---|
| WO | 9854530 A1 | 12/1998 |

* cited by examiner

*Primary Examiner* — Teresa Walberg
(74) *Attorney, Agent, or Firm* — Baker & Hostetler LLP

(57) ABSTRACT

The invention relates to a scraped surface heat exchanger (100) comprising a heat exchanging wall (20) having an cylindrical inner surface (21) with a radius (R+.delta.), a shaft (10) being rotatable mounted inside of and concentrically to the inner surface (21) of the heat exchanging wall (20) and having at least one gap portion (10A) with an outer surface (11) and a radius (R), and at least one scraping member (40) supported by the shaft (10) and extending to the inner surface (21) of the heat exchanger wall (20), characterized in that the at least one or the gap portions (10A) with an outer surface (11) and a radius (R) extend over at least 60% of the circumference of the shaft (10).

14 Claims, 5 Drawing Sheets

SCRAPED SURFACE HEAT EXCHANGER AND A METHOD FOR PRODUCING WHEY PROTEIN CONCENTRATE

CROSS-REFERENCE TO RELATED APPLICATIONS

This application is a divisional application of Ser. No. 12/089,338, filed Oct. 3, 2008, which claims priority to International Patent Application PCT/EP2006/009616, filed Oct. 4, 2006, which claims priority to European Application No. 05021730.6, filed Oct. 5, 2005, each of the disclosures of which are hereby incorporated by reference in their entirety.

TECHNICAL FIELD

The present invention relates to a scraped surface heat exchanger in accordance with the preamble of claim 1 and a method for producing whey protein concentrate in accordance with the preamble of claim 22.

RELATED PRIOR ART

The invention is especially useful for microparticulation (MP) of whey to make fat replacer for low fat products.

The increased market for slim, healthy and protein boosted sport products means new demands for the dairy industry.

The MP process is based on sweet whey, lactic acid whey or HCL casein whey. The particulate is very attractive as a fat replacer and a low cost protein source for a wide range of dairy and food products. Furthermore, its properties and functionality offer additional benefits to the dairy and food manufacturers.

MP involves an ultrafiltration (UF) process to make whey protein concentrate with 60% protein/TS (WPC 60) and a MP system to particulate the proteins. The MP system consists of a combination of tubular heat exchangers (THE) and scraped surface heat exchangers (SSHE) for heating in order to precipitate the whey proteins followed by cooling in combined SSHE and THE. An example is shown in FIG. 4.

As a result of the heat treatment the precipitated denatured proteins will aggregate, i.e. form large particles, but due to SSHE providing a controlled shear rate small protein particles are obtained.

The process results in formation of an average of approximately 5μ small protein particles identical to the size of fat globules in milk.

The obtained particulate has interesting characteristics and functional properties attractive for the dairy and food industry—especially as fat replacement in low fat products.

As an example the characteristics, properties and use of MP-WPC 60 are as follows:

Characteristics of MP-WPC 60:
Creamy, soft and whitish. Viscosity like cream
Protein particles like fat globules in milk, 1-12μ
Functional properties of MP-WPC 60:
Mouthfeel like fat and soft consistency
Water binding and increased viscosity
High nutritional value
possible use of MP-WPC 60 for low fat products:
Cheese of almost any kind
Yoghurt and milk desserts
Ice cream
Dressings and sauces
Fat emulsions and mayonnaise
many other fat containing foods
Possible to evaporate and dry, for application in:
Food designed ingredients The applicant has confirmed the process parameters to produce a high quality particulate on sweet as well as on lactic acid whey.

Tests have been made in commercial scale cheese vats with a major cheese manufacturer for Gouda/Edam type cheeses. The replacement of approx. 5% cheese milk with the WPC 60 particulate containing 10% total protein (whey protein) has clearly confirmed the following benefits:

A significant improvement of taste and texture of a 20+ cheese and a considerable increase in yield. Furthermore, the curd is less sticky and much easier to handle in the pre-pressing and mould system.

Unchanged taste of a 45+ cheese compared to a cheese without particulate, but with a considerable increase in yield.

In general, the whey protein is a low-cost protein source compared to casein, and our calculation confirms a very attractive return of investment (ROI) of less than one year. An additional benefit to the cheese manufacturers is a premium price for a higher quality 20+ cheese.

The invention pertains to an improvement to the SSHE step and equipment. Known SSHE have the disadvantage of a relatively high wear of the blades due to the high shear rate and speed necessary to obtain a mean particle size of about 5 μm (see FIG. 3), i.e. to obtain protein particles identical to the size of fat globules in milk.

Accordingly there is an object of the invention to provide an scraped surface heat exchanger for obtaining a mean particle size being about identical to the size of fat globules in milk which has a low wear.

Furthermore it is an object of the invention to provide a method for making whey protein concentrate (WPC) with a scraped surface heat exchanger having low wear.

SUMMARY OF THE INVENTION

The object of the invention is achieved with the features of the independent claims, especially the features of apparatus claims 1, 2, 3, 4, 5 and/or 6, and/or method claims 22 and/or 23. Preferred embodiments are disclosed in the dependent claims.

In accordance with one embodiment of the invention there is provided a scraped surface heat exchanger comprising a heat exchanging wall having an cylindrical inner surface with a first radius, a shaft being rotatable mounted inside of and concentrically to the inner surface of the heat exchanging wall and having at least one gap portion with an outer surface and a second (smaller) radius, and at least one scraping member supported by the shaft and extending to the inner surface of the heat exchanger wall, wherein the at least one or preferably the gap portions with an outer surface and a second radius extend over at least 60% of the circumference of the shaft.

Tests of the applicant have surprisingly shown that the wear of scrapers of the scraped surface heat exchanger can dramatically be reduced if the small gap (region of the gap portions) extends over at least 60% of the circumference of the shaft.

Alternatively but preferably in addition to the feature that the at least one or preferably the gap portions with an outer surface and a second radius extend over at least 60% of the circumference of the shaft, the ratio of the second radius of the at least one gap portion to the gap between the inner surface of the heat exchanger wall and the outer surface of the at least one gap portion is at least 6.

Tests of the applicant have also surprisingly shown that the wear of scrapers of the scraped surface heat exchanger can dramatically be reduced if the small gap (region of the gap portions) extends over at least 60% of the circumference of the shaft and/or the ratio is at least 6. If both conditions are fulfilled better results can be obtained.

Alternatively but preferably in addition to the feature that the at least one or preferably the gap portions with an outer surface and a second radius extend over at least 60% of the circumference of the shaft, and/or the feature that the ratio of the second radius of the at least one gap portion to the gap between the inner surface of the heat exchanger wall and the outer surface of the at least one gap portion is at least 6, the gap between the inner surface of the heat exchanger wall and the outer surface of the at least one gap portion is less than 15 mm.

Tests of the applicant have also surprisingly shown that the wear of scrapers of the scraped surface heat exchanger can dramatically be reduced if the small gap (region of the gap portions) extends over at least 60% of the circumference of the shaft and/or the ratio is at least 6 and/or the gap is less than 15 mm. If more than one and preferably all conditions are fulfilled better results can be obtained.

Alternatively but preferably in addition to the feature the feature that the at least one or preferably the gap portions with an outer surface and a second radius extend over at least 60% of the circumference of the shaft, and/or the feature that the ratio of the second radius of the at least one gap portion to the gap between the inner surface of the heat exchanger wall and the outer surface of the at least one gap portion is at least 6, and/or the feature that the gap between the inner surface of the heat exchanger wall and the outer surface of the at least one gap portion is less than 15 mm, the inner surface of the heat exchanger wall comprises a protective layer.

Tests of the applicant have also surprisingly shown that the wear of, scrapers of the scraped surface heat exchanger can dramatically be reduced if the inner surface of the heat exchanger wall comprises a protective layer and/or the small gap (region of the gap portions) extends over at least 60% of the circumference of the shaft and/or the ratio is at least 6 and/or the gap is less than 15 mm. If more than one and preferably all conditions are fulfilled better results can be obtained.

Alternatively but preferably in addition to the feature that the at least one or preferably the gap portions with an outer surface and a second radius extend over at least 60% of the circumference of the shaft, and/or the feature that the ratio of the second radius of the at least one gap portion to the gap between the inner surface of the heat exchanger wall and the outer surface of the at least one gap portion is at least 6, and/or the feature that the gap between the inner surface of the heat exchanger wall and the outer surface of the at least one gap portion is less than 15 mm, and/or the feature that the inner surface of the heat exchanger wall comprises a protective layer, the shear rate ($D=1/30*n*n*R/\delta$) is less than 600/s.

Tests of the applicant have also surprisingly shown that the wear of scrapers of the scraped surface heat exchanger can dramatically be reduced if the shear rate is less than 600/s and/or the inner surface of the heat exchanger wall comprises a protective layer and/or the small gap (region of the gap portions) extends over at least 60% of the circumference of the shaft and/or the gap is less than 15 mm and/or the ratio is at least 6. If more than one and preferably all conditions are fulfilled better results can be obtained.

Alternatively but preferably in addition to the feature that the at least one or preferably the gap portions with an outer surface and a second radius extend over at least 60% of the circumference of the shaft, and/or the feature that the ratio of the second radius of the at least one gap portion to the gap between the inner surface of the heat exchanger wall and the outer surface of the at least one gap portion is at least 6, and/or the feature that the gap between the inner surface of the heat exchanger wall and the outer surface of the at least one gap portion is less than 15 mm, and/or the feature that the inner surface of the heat exchanger wall comprises a protective layer, and/or the feature that the shear rate ($D=1/30*n*n*R/\delta$) is less than 600/s, the scraped surface heat exchanger is operated with a speed of the shaft of less than 900 RPM.

Tests of the applicant have also surprisingly shown that the wear of scrapers of the scraped surface heat exchanger can dramatically be reduced if the speed is less than 900 RPM and/or the shear rate is less than 600/s and/or the inner surface of the heat exchanger wall comprises a protective layer and/or the small gap (region of the gap portions) extends over at least 60% of the circumference of the shaft and/or the gap is less than 15 mm and/or the ratio is at least 6. If more than one and preferably all conditions are fulfilled better results can be obtained.

With the embodiments of the invention having the features of one or more independent claims, the following advantages over the prior art embodiments can be achieved:

- The production time between cleaning cycles can be extended at least 50%, i.e. for example from 4 hours to 6 hours, thus saving 2 cleaning cycles per 24 hour production, corresponding to 33% saving in cleaning time, agents and power.
- The shear rate and the speed (RPM) of the shaft can be reduced to at least 50% compared to the prior art in order to obtain a mean particle size of about 5 μm. (See FIG. 3; With the prior art device a shear rate of more than 630/s and a speed of at least 1200 RPM was needed, whereas with a SSHE in accordance with the invention a shear rate of about 300/s and a speed of about 600 RPM can be used. Accordingly a saving in electrical power of more than 50% is achievable.
- Because the shear rate/speed of the shaft can be reduced to the half (compared to the prior art), the blades/knives which scrape the inner surface of the heat exchanging wall will last much longer (probably at least 150% compared to the prior art). This will result in a longer life time of blades/knives before they are worn out and must be exchanged. This will save maintenance and spare part costs.
- Because the shear rate/speed of the shaft can be reduced to the half (compared to the prior art), the inner surfaces of the heat exchanger walls which are scraped with the blades/knives, will last much longer (probably at least 150% compared to the prior art). This will result in much longer life time of the heat exchanger walls before they are worn out and must be exchanged. This will save maintenance and spare part costs.
- The particle size distribution is very narrow around the average size of the particles, compared to state of the art products. Typically about 95% of the particles are within +/−3 μm around the average size of the particles.

According to an embodiment of the invention the ratio of the second radius of the at least one gap portion to the gap between the inner surface of the heat exchanger wall and the outer surface of the at least one gap portion can be at least 7, preferably at least 10, more preferably at least 13 and most preferably at least 16.

According to an embodiment of the invention the gap between the inner surface of the heat exchanger wall and the outer surface of the at least one gap portion can be less than 13 mm, preferably less than 10 mm, more preferably less than 7 mm, even more preferably less than 5 mm and most preferably less than 3 mm.

According to an embodiment of the invention the at least one or preferably the gap portions with an outer surface and a second radius can extend over at least 70%, preferably at least 75%, more preferably at least 80% and most preferably at least 85% of the circumference of the shaft.

According to an embodiment of the invention the inner surface of the heat exchanger wall can be hard chromed.

According to an embodiment of the invention the shear rate $(D=v(R)/\delta=1/30*n*n*R/\delta)$ can be than 500/s, preferably less than 400/s, more preferably less than 350/s and most preferably less than 300/s.

According to an embodiment of the invention the scraped surface heat exchanger can be operated with a speed of the shaft of less than 800 RPM, preferably less than 700 RPM, more preferably less than 600 RPM and most preferably less than 500 RPM.

According to an embodiment of the invention the shaft can comprise at least two gap portions with an outer surface and a second radius.

According to an embodiment of the invention the at least two gap portions can be arranged symmetrical with respect to the axis of rotation.

According to an embodiment of the invention the shaft can comprise cut-off portions each being arranged between two gap portions.

According to an embodiment of the invention one scraping member can be arranged at one cut-off portion.

According to an embodiment of the invention the at least one scraping member can comprise a scraping blade, preferably made of plastic.

According to an embodiment of the invention the heat exchanging wall can be made of stainless steel, preferably hard chromed at its inner surface.

According to an embodiment of the invention the at least one scraping member can be pivotally mounted at the shaft.

According to an embodiment of the invention the shaft can comprise a recess connected to passages (71, 72) for passing a cooling fluid through the recess.

According to an embodiment of the invention there can be in addition an outer wall defining a heat exchanger fluid room between its inner surface and the outer surface of the heat exchanging wall.

In accordance with one embodiment of the invention there is provided a method for making whey protein concentrate (WPC) comprising at least the following steps: (a) heating whey protein material in a scraped surface heat exchanger, (b) holding the whey protein material heated for a processing time, (c) cooling the whey protein material in a scraped surface heat exchanger, wherein whey protein material is scraped from an inner surface of an heat exchanging wall of the scraped surface heat exchanger with at least one scraping member in order to generate whey protein concentrate having an average particle size of less than 7 µm, wherein the shear rate $(D=v(R)/\delta=1/30*n*n*R/\delta)$ exerted by the scraping member on the whey protein material is less than about 600/s.

Alternatively but preferably in addition to the feature that the shear rate $(D=v(R)/\delta=1/30*n*n*R/\delta)$ exerted by the scraping member on the whey protein material is less than about 600/s, the scraped surface heat exchanger can be operated with a speed of the shaft of less than 900 RPM.

According to an embodiment of the invention the shear rate $(D=v(R)/\delta=1/30*n*n*R/\delta)$ exerted by the scraping member on the whey protein material can be less than 500/s, preferably less than 400/s, more preferably less than 350/s and most preferably less than 300/s.

According to an embodiment of the invention the scraped surface heat exchanger can be operated with a speed of the shaft of less than 800 RPM, preferably less than 700 RPM, more preferably less than 600 RPM and most preferably less than 500 RPM.

According to an embodiment of the invention the generated whey protein concentrate can have an average particle size of less than 6 µm.

According to an embodiment of the invention the generated whey protein concentrate can have an average particle size of greater than 2 µm.

According to an embodiment of the invention the generated whey protein concentrate can have an average particle size of greater than 3 µm.

According to an embodiment of the invention the generated whey protein concentrate can have a protein content from 40 to 90% of the dry matter.

According to an embodiment of the invention the generated whey protein concentrate can have an protein content from 60 to 80% of the dry matter.

According to an embodiment of the invention the generated whey protein concentrate can have a dry matter content greater than 10%.

According to an embodiment of the invention at least two and preferably all of the steps (a) and (b) and (c) can be carried out in the same scraped surface heat exchanger.

According to an embodiment of the invention the steps (a), (b) and (c) can be carried out in a plurality of scraped surface heat exchangers.

According to an, embodiment of the invention the whey protein material can be preheated in a tubular heat exchanger before step.

According to an embodiment of the invention the whey protein material can be cooled in a tubular heat exchanger after step.

According to an embodiment of the invention the method can be carried out with a scraped surface heat exchanger in accordance with any of the above mentioned embodiments of the invention.

DESCRIPTION OF THE DRAWINGS

The invention will be described in detail in the following with reference to the drawings in which.

DETAILED DESCRIPTION OF AN EMBODIMENT OF THE INVENTION

Figure 1:
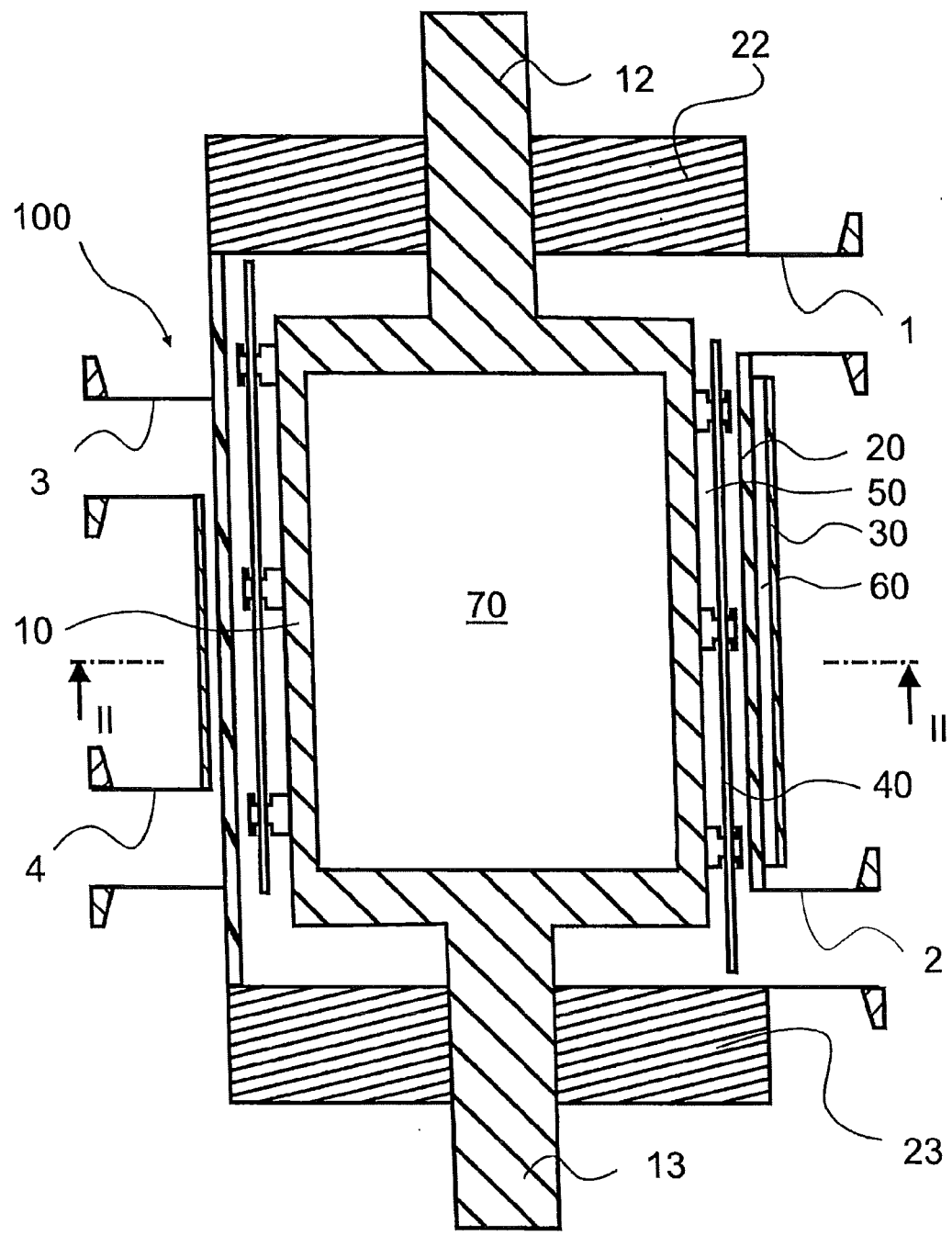
FIG. 1 is a sectional view of a scraped surface heat exchanger in accordance with an embodiment of the invention.
Figure 2:
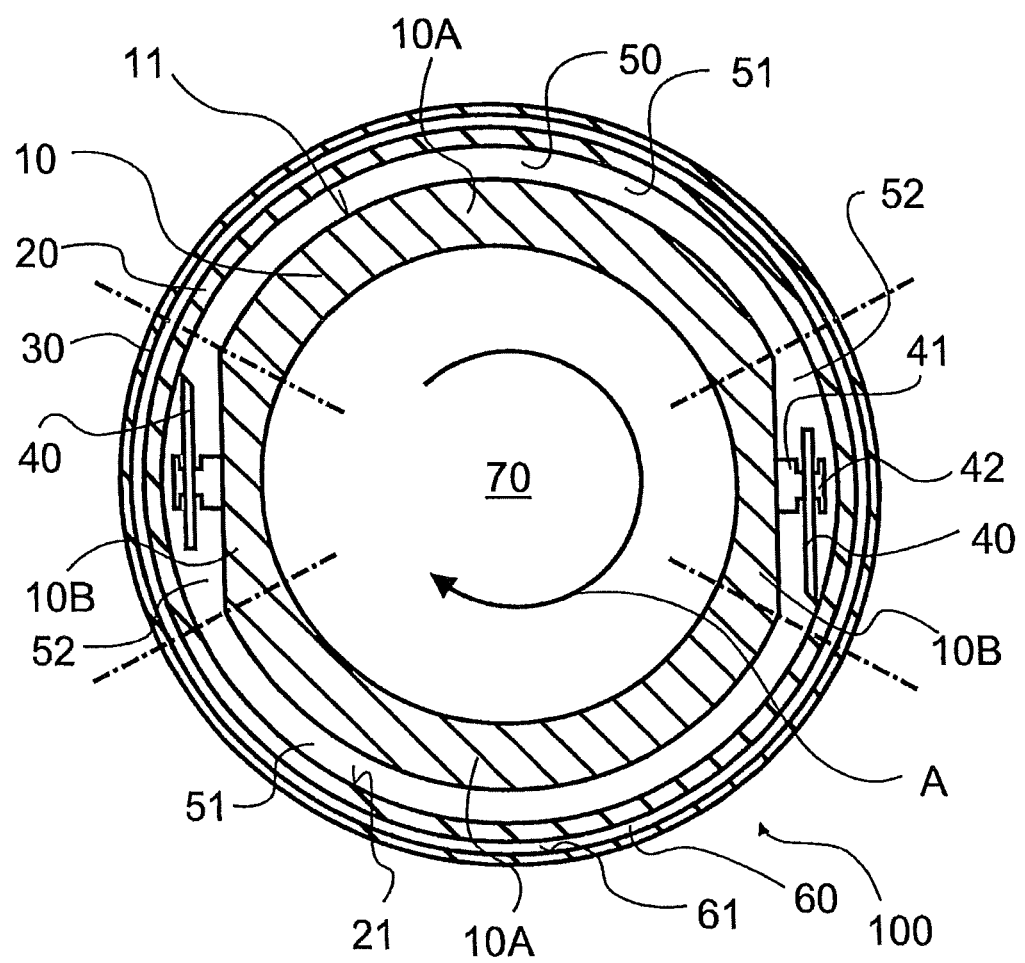
FIG. 2 is a cross section of the embodiment of FIG. 1 along lines II-II of FIG. 1.

The following reference numbers are used in the specification:

1 inlet (product)
2 outlet (product)
3 inlet (heat exchanging medium)
4 outlet (heat exchanging medium)
10 shaft (rotatable mounted, hollow or solid)
10A gap portion
10B cut-off portion
11 outer surface (of 10, having radius R)
12 upper bearing portion
13 lower bearing portion
20 heat exchanging wall
21 inner surface (of 20, having radius R+δ)
22 top wall
23 bottom wall
30 outer wall (jacket wall)
40 scraping member
41 tab
42 shaft portion
50 product room
51 gap region
52 scraper region
60 heat exchanger fluid room
70 recess
71 passage
72 passage
100 scraped surface heat exchanger
A direction of rotation
D shear rate
R radius
δ gap
v(R) circumferential speed FIG. 1 is a sectional view of a scraped surface heat exchanger 100 in accordance with an embodiment of the invention which can be used to carry out the method of the invention. FIG. 2 is a cross section along lines II-II of FIG. 1.

The scraped surface heat exchanger 100 comprises a heat exchanging wall 20 having a cylindrical inner surface 21. A shaft 10 is rotatably mounted inside of and concentrically to the inner surface 21 of the heat exchanging wall 20 and comprises two gap portions 10A with an partial cylindrical outer surface 11 being concentrical with the inner surface 21 of the heat exchanging wall 20. Between the gap portions 10A there are two opposing cut-off portions 10B. In FIG. 2 dash-pointed lines are shown as auxiliary lines to indicate the separation between the gap portions 10A and the cut-off portions 10B.

Due to the gap portions 10A and the cut-off portions 10B, the product room 50 is similarly divided into two gap regions 51 and two scraper regions 52. The separation is shown by the above mentioned dash-pointed auxiliary lines in FIG. 2.

The product room 50 is defined by the heat exchanging wall 20, an top wall 22 and a bottom wall 23. The shaft 10 comprises an upper bearing portion 12 and a lower bearing portion 13 which are supported by the top wall 22 and the bottom wall 23, respectively in a common manner known to the skilled person.

In use the processed product enters the SSHE 100 through the inlet 1 and passes through the product room 50. After the product has been processed the product exits trough outlet 2.

The cut-off-portions 10B are each equipped with tabs 41 onto which scraping members 40 are mounted. The scraping members 40 each comprise a blade which is pivotable mounted onto shaft portions 42 of the tabs 41. The blades extend to the inner surface 21 of the heat exchanger wall 20.

The shaft 10 can rotate in the direction A. The direction of rotation of the shaft 10 is indicated in FIG. 2 by the arrow A. If the shaft 10 rotates in direction A, the blades of the scraping members 40 contact the inner surface 21 of the heat exchanging wall 20. Thereby accumulated matter adhering on the heat exchanging wall 20 will be scraped off the wall and an shear rate D is exerted thereon, whereby the accumulated matter will be particulated.

The scraped surface heat exchanger 100 furthermore comprises an outer wall or jacket wall 30 enclosing the outer surface of the heat exchanging wall 20.

Between the jacket wall 30 and the heat exchanging wall 20 there is an heat exchanger fluid room 60. Heating or cooling fluid is circulated between the outer wall 30 and the heat exchanging wall 20. The heat exchanger fluid enters the heat exchanger fluid room 60 through the inlet 3 and leaves the heat exchanger fluid room 60 through outlet 4.

The shown scraped surface heat exchanger has in contrast to traditional horizontal configurations a vertical design which will save floor space. However it is possible within the scope of the invention to have also a horizontal or inclined configuration.

The shaft comprises: an upper and an lower bearing portion 12, 13 located in bearings (not shown) in the top wall 22 and the bottom wall 23. Furthermore there are sealing means (not shown) for sealing the product room against the bearings and/or the exterior. The skilled person is aware of this standard technique and is able to choose the necessary parts and to fit them into the shown embodiments.

The scraper blades can be in a variety of materials including high temperature plastics or stainless steel. Other suitable materials are possible.

The heat exchanging wall 20 (and the top and bottom wall 22, 23) can be made of corrosion-resistant material, for instance stainless steel or several metallic compositions. The preferred material or the heat exchanging wall 20 is stainless steel wherein the inner surface 21 is extremely high finished (for instance high grinned) and preferably hard chromed.

Figure 1A:
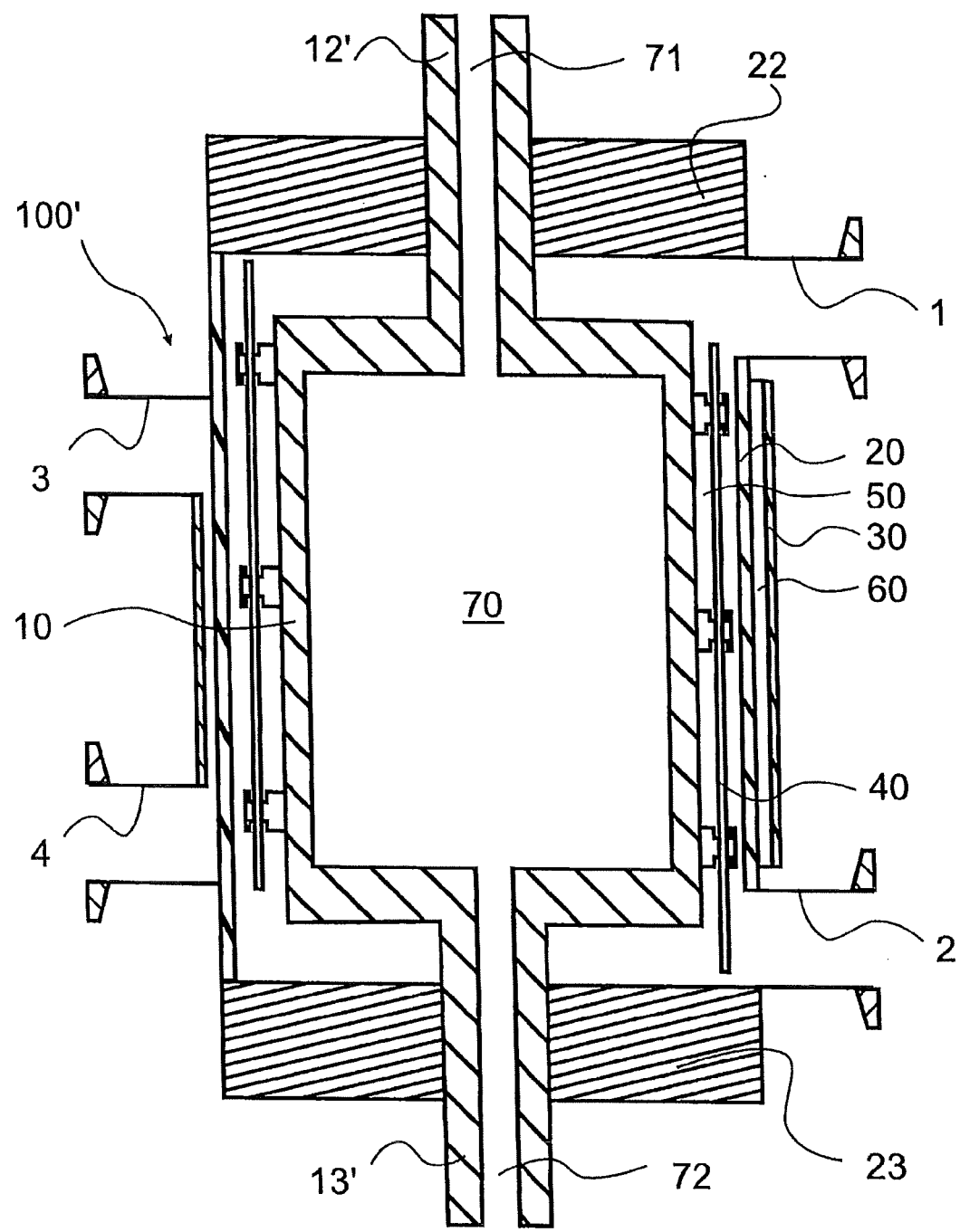
FIG. 1A is a sectional view of a scraped surface heat exchanger in accordance with another embodiment of the invention.

FIG. 1A is a sectional view of a scraped surface heat exchanger 100' in accordance with another embodiment of the invention. This embodiment is almost identical to the embodiment as shown in FIGS. 1 and 2. For the description of the identical parts reference is made to the description of the other embodiment and only the differences are described.

In the embodiment of FIG. 1A there are passages 71, 72 provided in the upper bearing portion 12' and 13'. The passages 71 and 72 are connected to the recess 70 in the shaft and can be used to provide a cooling agent (for instance cold tap water) for cooling the outer surface 11 of the shaft 10. Cooling the outer surface 11 of the shaft 10 will help to avoid that the product sticks onto the outer surface 11 of the shaft. Therefore the running time of the SSHE can be extended because the cleaning cycle can be extended. The provision and connection of tubes and equipment for providing cooling agent to the recess 70 is within the skill and knowledge of the skilled person.

The shown embodiments can be big models for industrial use and/or down-sized models for laboratory pilot plants or small runs.

Figure 3:
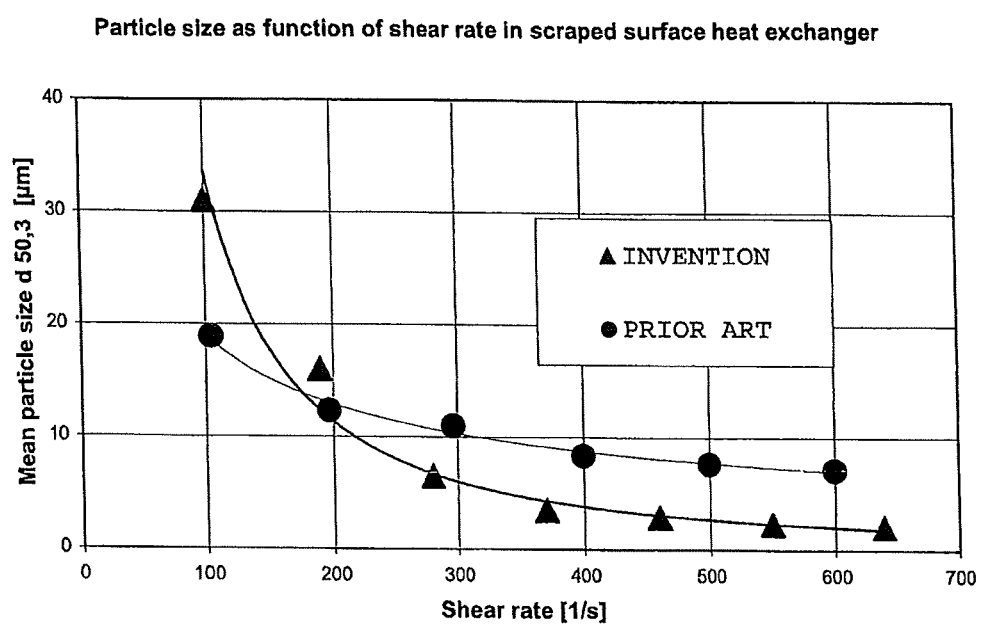
FIG. 3 is a graph showing the correlation of the mean particle size over the shear rate of the embodiment of the invention as compared with this correlation obtained with a prior art scraped surface heat exchanger.

FIG. 3 is a graph showing the correlation of the mean particle size over the shear rate of the embodiment of the invention in accordance with FIGS. 1 and 2 as compared with this correlation obtained with a prior art scraped surface heat exchanger. The mean particle size is apart from the shear rate also influenced by the heat load and the product composition (i.e. protein %, lactose %, calcium %; pH, etc.). The graphs are showing the influence of the shear rate to the mean particle size in a process in accordance with FIG. 4, with all other parameter fixed. The graph marked with invention was obtained with a SSHE having a gap δ=9 mm, a ratio R/δ=7,3 and a relative gap region of 72%. The graph marked with prior art was obtained with a SSHE having a gap δ=15 mm, a ratio R/δ=5 and a relative gap region of 55%.

It is shown that the invention can obtain the desired mean particle size of 5 μm with much smaller shear rates and accordingly with a lower wear of the scraper.

Figure 4:
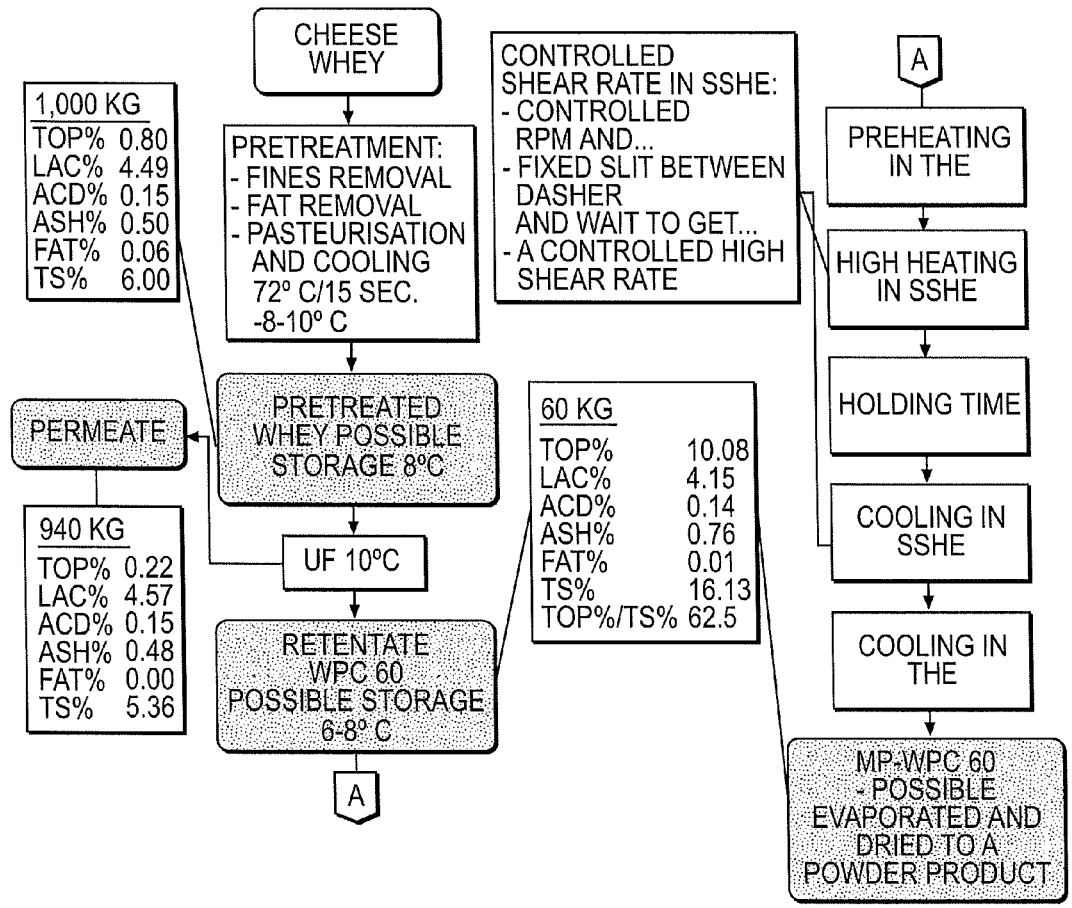
FIG. 4 is a diagram illustrating a possible use of the invention.

FIG. 4 shows an exemplary process in which the invention is preferably used (in the high heating in SSHE step and optionally also in the cooling in SSHE step).

It is clear that the description of the specific embodiments of the invention is not be intended to limit the scope of protection which is defined by the claims. It is also clear that obvious alternatives which the skilled person will notice by reading the specification, are intended to be in the scope of protection as defined by the claims.

The invention claimed is:

1. A method for producing whey protein concentrate (WPC) comprising at least the following steps:
   heating whey protein material in a scraped surface heat exchanger,
   holding the whey protein material heated for a processing time, and
   cooling the whey protein material in a scraped surface heat exchanger,
   wherein whey protein material is scraped from an inner surface of a heat exchanging wall of the scraped surface heat exchanger with at least one scraping member in order to generate whey protein concentrate having an average particle size of less than 7 μm, wherein the shear rate exerted by the scraping member on the whey protein material is less than about 600/s.

2. The method according to claim 1, wherein the scraped surface heat exchanger is operated with a speed of the shaft of less than 900 RPM.

3. The method according to claim 1, wherein the shear rate exerted by the scraping member on the whey protein material is less than 500/s, preferably less than 400/s, more preferably less than 350/s and most preferably less than 300/s.

4. The method according to claim 1, wherein the scraped surface heat exchanger is operated with a speed of the shaft of less than 800 RPM, preferably less than 700 RPM, more preferably less than 600 RPM and most preferably less than 500 RPM.

5. The method according to claim 1, wherein the generated whey protein concentrate has an average particle size of less than 6 μm.

6. The method according to claim 1, wherein the generated whey protein concentrate has an average particle size of greater than 2 μm.

7. The method according to claim 1, wherein the generated whey protein concentrate has an average particle size of greater than 3 μm.

8. The method according to claim 1, wherein the generated whey protein concentrate has an protein content from 30 to 90% of the dry matter.

9. The method according to claim 1, wherein the generated whey protein concentrate has a protein content from 50 to 80% of the dry matter.

10. The method according to claim 1, wherein the generated whey protein concentrate has a dry matter content greater than 10%.

11. The method according to claim 1, wherein at least two and preferably all of the steps (a) and (b) and (c) are carried out in the same scraped surface heat exchanger.

12. The method according to claim 1, wherein at least two and preferably all of the steps (a) and (b) and (c) are carried out in a plurality of scraped surface heat exchangers.

13. The method according to claim 1, wherein the whey protein material is preheated in a tubular heat exchanger before step (a).

14. The method according to claim 1, wherein the whey protein material is cooled in a tubular heat exchanger after step (c).

* * * * *